(12) United States Patent
Xue et al.

(10) Patent No.: US 7,856,213 B2
(45) Date of Patent: Dec. 21, 2010

(54) METHOD, SYSTEM, AND DEVICE FOR SPECIFYING SELECTIVE OVERRIDE OF DO-NOT-DISTURB FUNCTIONALITY

(75) Inventors: Hao Xue, Ottawa (CA); Muhammad Kilaledul Islam, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 455 days.

(21) Appl. No.: 10/787,297

(22) Filed: Feb. 27, 2004

(65) Prior Publication Data

US 2005/0192039 A1 Sep. 1, 2005

(51) Int. Cl.
*H04B 1/38* (2006.01)

(52) U.S. Cl. .................. 455/90.2; 455/517; 455/518; 455/521

(58) Field of Classification Search ............ 455/90.2, 455/445, 518, 521, 412.1, 517; 379/207.02, 379/207.11, 207.13, 208.01, 210.02
See application file for complete search history.

(56) References Cited

U.S. PATENT DOCUMENTS

| | | | | |
|---|---|---|---|---|
| 3,564,148 | A * | 2/1971 | Lee ..................... | 379/210.02 |
| 4,278,844 | A | 7/1981 | Jones | |
| 5,467,388 | A | 11/1995 | Redd, Jr. et al. ........... | 379/196 |
| 5,872,840 | A * | 2/1999 | Wu ........................ | 379/197 |
| 6,418,215 | B1 * | 7/2002 | Schessel ................ | 379/207.02 |
| 2002/0085698 | A1 * | 7/2002 | Liebenow .............. | 379/207.13 |
| 2002/0186827 | A1 * | 12/2002 | Griffiths ................ | 379/207.02 |
| 2004/0005904 | A1 * | 1/2004 | Wolf et al. ................. | 455/519 |

FOREIGN PATENT DOCUMENTS

| | | |
|---|---|---|
| CA | 2400385 | 8/2001 |
| EP | 1 213 934 A | 6/2002 |
| JP | 61-154344 | 7/1986 |
| JP | 64-054853 | 3/1989 |
| JP | 02-067829 | 3/1990 |
| JP | 2000-349906 | 12/2000 |
| JP | 2001-103551 | 4/2001 |
| WO | 02102040 | 12/2002 |
| WO | WO 03/011410 A1 | 2/2003 |
| WO | WO 2004/075581 | 9/2004 |

OTHER PUBLICATIONS

Ericsson, Motorola, Siemens, Nokia Push to Talk over Cellular (PoC); User Requirements; PoC Release 1.0; User Requirements V 1.1.1 (Oct. 2003).*

(Continued)

*Primary Examiner*—Tuan H Nguyen (57) ABSTRACT

The present invention provides methods, systems, and devices for selective override of do-not-disturb in a wireless communications network, in which a user is provided with the option to query and modify the ignoring of do-not-disturb (DnD) for certain reasons. In some embodiments, DnD is ignored when an incoming call is an urgent call. In other embodiments DnD is ignored when an incoming call is an emergency call. In some embodiments a call processing server manages and performs selective override of do-not-disturb in an OMA compatible system. In yet other embodiments, a mobile device is adapted to send to a dispatch network a request to query or set an ignoreDnD flag, along with associated ignoreDnD reasons.

10 Claims, 6 Drawing Sheets

OTHER PUBLICATIONS

OMA Input Contribution document, (referring to PoC documents) Doc. #OMA-POC-2003-0007Ri- Contributed Specification Suite.
iDEN™ Technical Overview document, 68P81095E55-E (Software Release 9.1.
Push-to-Talk over Cellular (PoC) User Plane; Transport Protocols; PoC Release 1.0, Transport Protocols V1.1.1 (Oct. 2003).
Push to Talk over Cellular (PoC); List Management and Do-not-Disturb; PoC Release 1.0; List Management and Do-not-Disturb V1.1.4 (Oct. 2003).
Push-to-Talk over Cellular (PoC) User Plane; (E)GPRS/UMTS Specification; PoC Release 1.0; (E)GPRS/UMTS Specification V1.1.1 (Oct. 2003).
Push-to-Talk over Cellular (PoC); Signalling Flows; PoC Release 1.0; Signalling Flows V1.1.4 (Oct. 2003).
Push-to-talk over Cellular (PoC); Architecture; PoC Release 1.0, Architecture V.1.1.1 (Oct. 2003).
Push-to-Talk over Cellular (PoC); User Requirements; PoC Release 1.0; User Requirements V1.1.1 (Oct. 2003).

* cited by examiner

METHOD, SYSTEM, AND DEVICE FOR SPECIFYING SELECTIVE OVERRIDE OF DO-NOT-DISTURB FUNCTIONALITY

FIELD OF THE INVENTION

The invention relates to communication systems and more particularly to call management for systems which provide do-not-disturb (DnD) functions.

BACKGROUND OF THE INVENTION

In communications systems with voice call features, a user of a device or near a device is often alerted to an incoming call via an indication to the user in audible form such as a tone or ring, in kinesthetic form such as a vibration, or in visual form such as a flashing light. Some communications systems provide devices which alert the user in a relatively non-intrusive manner. However, there are situations when a user may decide not to receive an incoming call. In some communications systems, due to the way in which they operate, an incoming call and its alert can be intrusive and distracting or even dangerous.

In wireless communication systems which provide dispatch services, push-to-talk™ (PTT™) services are often provided. Push-to-talk™ services typically provide walkie-talkie-like functionality or two-way half-duplex voice communication which enables a single user to communicate with another single user (as in a private session) or enables the single user to communicate with a group of other users (as in a group session). When referred to herein, walkie-talkie-like functionality and half-duplex voice functionality are to be taken generally to mean any network delivered voice communication functionality which at any one time is capable of transmitting voice communication from a talking or transmitting party's device to a listening or receiving party's device, but does not simultaneously transmit voice communication from the receiving party's device to the talking party's device, while the talking party's device is transmitting voice to the receiving party's device. Groups can operate in automatic answer mode or in manual answer mode. In push-to-talk™, for a group in automatic answer mode, voice reception is instantaneous, and requires no recipient action. For a group in manual answer mode, before voice reception, recipient action is required to accept or decline the incoming talk request. Situations may arise where automatic communication or a request for communication would be intrusive, and a user may wish to have no interruptions from calls for a period of time. Additionally, the user may wish not to have to take any action to deny talk requests during that period.

In known systems, do-not-disturb (DnD) functionality is provided so that the user's device and hence the user are not disturbed by an incoming call. When this feature is active, no incoming call is offered to the user. DnD also blocks other forms of alerting, such as Message Waiting Notification alerting. Do-not-disturb makes the user inaccessible for call delivery. This DnD functionality is provided for users of half-duplex voice systems and full duplex voice systems, who do not want to be disturbed. This feature is also defined in IS-41-based systems.

In known systems providing DnD such as the Push-to-Talk™ over Cellular (PoC) system (part of the OMA standard), a user typically requests activation of DnD from the user device, which sends a request to a GLMS (group list management server) or similar call processing server to activate a DnD setting resident at the GLMS for the user device. Once the DnD setting has been changed in the GLMS to a state of do-not-disturb, the GLMS stops all subsequent incoming talk session requests directed to the user's device. According to some standards this is accompanied by the GLMS sending a busy indication to the calling party.

In addition to DnD management the GLMS performs access list management. Access lists are used to specify who is permitted or not permitted to establish a PTT™ session with a specific user device. Both a reject list, and an accept list can be stored for a user device, so that calls from specific user devices on these lists are respectively rejected or accepted automatically.

Figure 1:
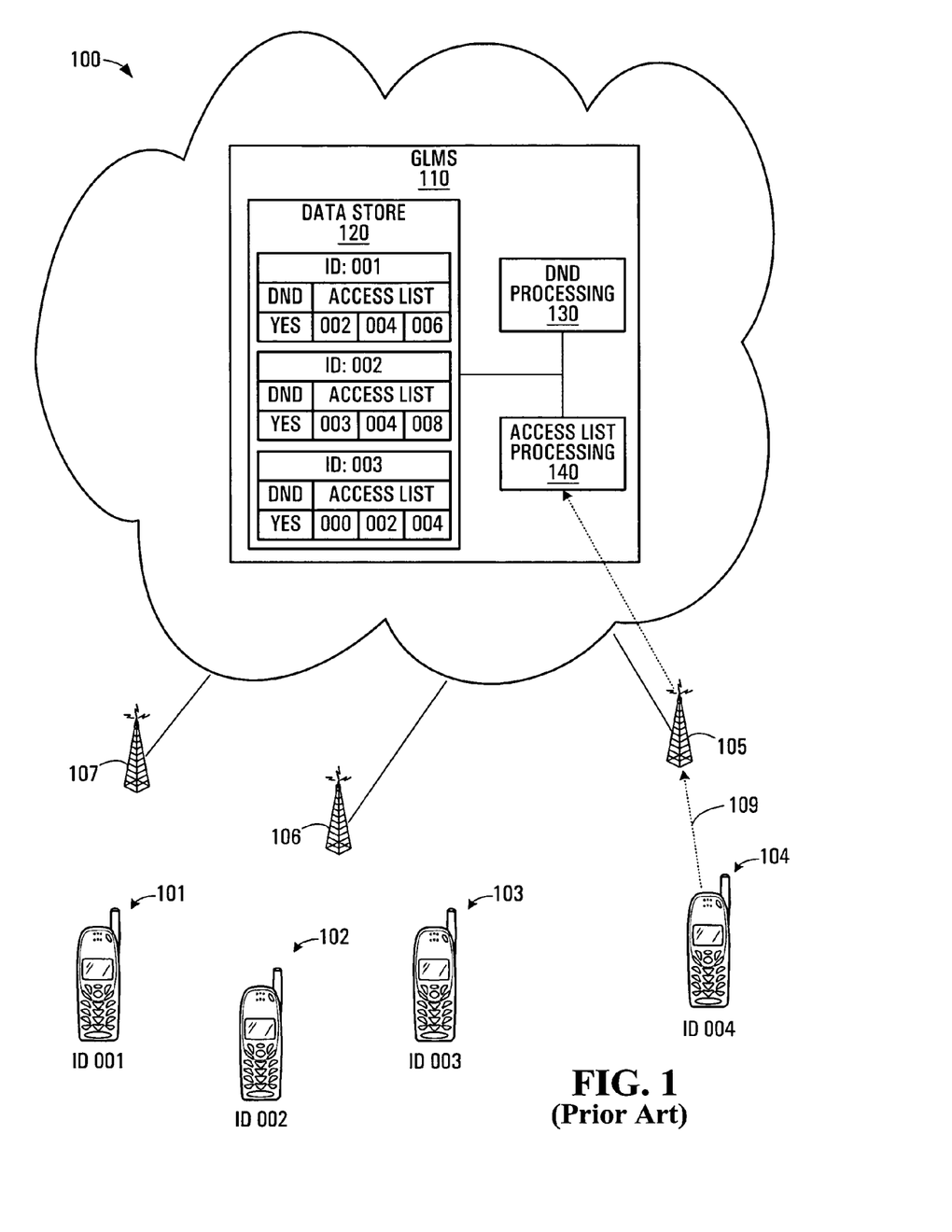
FIG. 1 is a block diagram depicting elements of a known communications system participating in services having do-not-disturb functionality.

A standard system architecture in which wireless dispatch call management is performed is defined by the OMA (open mobile alliance) standard. Depicted in FIG. 1 is an OMA compliant system which includes push-to-talk™ over cellular (PoC) services. The overall architecture of the known OMA compliant system is generally indicated by reference numeral 100, and includes a known GLMS (group list management server) 110 which manages groups and lists (e.g. contact and access lists) that are needed for the PoC service. Also shown are the BTSs (base transceiver stations) 105, 106, 107 through which users can access the system. The illustrated example shows four user devices 101, 102, 103, 104 having respective identifiers (ID) 001, 002, 003, and 004.

The known GLMS 110 provides list management operations to create, modify, retrieve and delete groups and lists, and to provide storage therefor. Data store 120 provides storage for the known GLMS which includes access lists and DnD flags stored by the user device. The data for the DnD flags and access lists are shown in respect of known user devices 101, 102, and 103 in association with IDs 001, 002, 003. The access list is provided for each known user device (101, 102, 103) and specifies which other known user devices are permitted to reach the respective known user device (101, 102, or 103) over PoC. For example, for user device 101 having ID 001, the access list contains 002, 004, 006, indicating that the device having these IDs are allowed to reach the user device 101. The known GLMS 110 also stores for each known user device a DnD flag which may either be a "YES" or a "NO" value which dictates whether or not the user device is in a state of do-not-disturb. Each user device's DnD flag and access list helps facilitate management of talk requests directed to that user device.

According to the OMA standard, the user device is permitted to query and set the value of the DnD flag of that user device, but generally is not permitted to directly query or set the value of a DnD flag of another user device.

FIG. 1 depicts a known user device 104 with ID 004 which is sending a group talk request 109 for a session with other known user devices 101, 102, and 103, all of which are part of the group as defined by OMA. The talk request 109 is received and forwarded by the Radio Access Network (RAN) 105 to the known system 100. Once the request is forwarded to the known GLMS 110, DnD Processing 130 and Access List Processing 140 take place to determine if the talk request 109 is forwarded. Since each of the known user devices 101, 102, and 103, has an associated DnD flag of "YES" in the data store 120 of the known GLMS 110, none of the known user devices 101, 102, and 103, are forwarded the talk request 109 which would take place over RANs 106 and 107.

Figure 2:
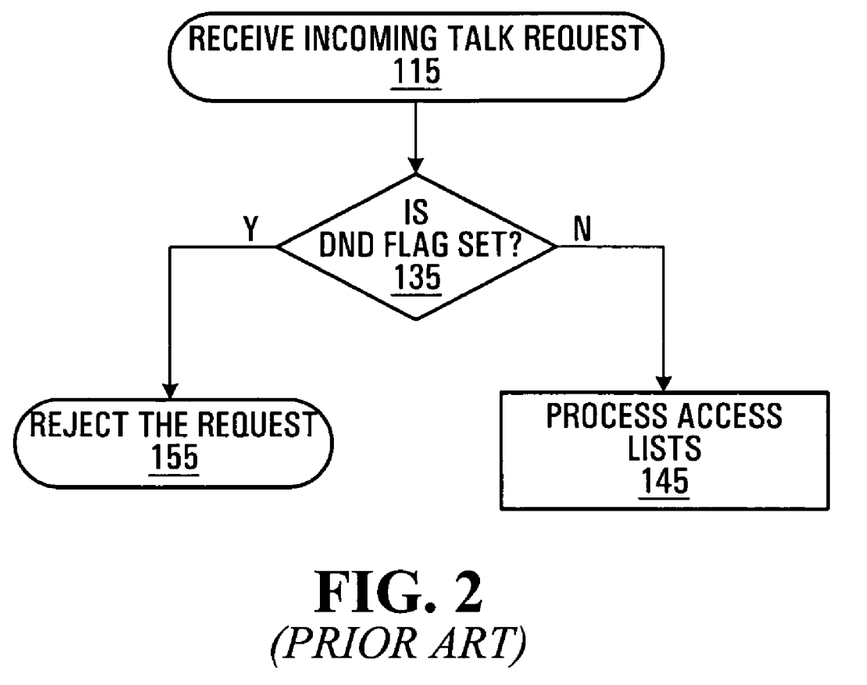
FIG. 2 is a flow diagram illustrating the steps performed by a GLMS of a known communications system having do-not-disturb functionality in processing an incoming talk request to a user device.

FIG. 2 shows the steps performed by a known GLMS in a known OMA compliant system to manage incoming calls for a user device using the stored DnD flag and access list for that user device. At step 115, the known GLMS receives an incoming talk request specifying the user device as the device being called. In step 135 the known GLMS checks the DnD flag associated with the user device identified in the talk request. If the DnD flag is set to "NO" then processing of the call continues at step 145 wherein the access lists are processed to assess whether the talk request should be forwarded to the user device or not. If the DnD flag 130 is set to "YES" then the talk request is rejected in step 155, and the user's device is not disturbed.

SUMMARY OF THE INVENTION

The present invention provides methods, systems, and devices for selective override of do-not-disturb in a wireless communications network, in which a user is provided with an option to query and modify the ignoring of do-not-disturb (DnD) for certain reasons associated with an incoming call. In some embodiments, the DnD is ignored when the incoming call is an urgent call. In other embodiments DnD is ignored when an incoming call is an emergency call. In some embodiments a network call processing server manages and performs selective override of do-not-disturb in an OMA compatible system. In yet other embodiments, a mobile device is adapted to send to a dispatch network of the wireless communications network a request to query or modify an ignoreDnD attribute, including an ignoreDnD flag, along with associated ignoreDnD reasons.

According to one broad aspect, the invention provides a method of talk request processing in a do-not-disturb (DnD) capable communication system, the method comprising: receiving a talk request for a requested communications session involving a user device capable of walkie-talkie-like functionality; and selectively overriding DnD functionality for the requested communications session as a function of an ignoreDnD attribute for the user device.

According to another broad aspect, there is provided a non-transitory computer readable medium having computer executable instructions stored thereon for execution on a processor so as to implement the method summarized above.

According to another broad aspect, the invention provides a talk request processing system in a do-not-disturb (DnD) capable communication system, the talk request processing system comprising: a receiver adapted to receive a talk request for a requested communications session involving a user device capable of walkie-talkie-like functionality; and a network call processing function adapted to selectively override DnD functionality for the requested communications session as a function of an ignoreDnD attribute for the user device.

According to another broad aspect, the invention provides a user device capable of walkie-talkie-like functionality for a do-not-disturb (DnD) capable communication system, the user device comprising: a user interface adapted to accept an external input to modify an ignoreDnD attribute for the user device; an ignoreDnD attribute request generator responsive to said external input adapted to send a network call processing server a request to update an ignoreDnD attribute of the user device.

According to yet another broad aspect, the invention provides a memory for storing data for access by a talk request processing system, comprising: a data structure stored in said memory, said data structure being an ignoreDnD attribute comprising at least one predetermined ignore reason value.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

In certain circumstances, it would be desirable that an incoming call be forwarded to a particular user device even if that user device has its DnD flag set at a call processing server not to disturb the user. Such a situation may occur for example, in an emergency, or when the call is urgent or for any other reason the subscriber or user would deem that this should be the case. In such a situation, there is provided by various embodiments of the invention, methods, systems, and devices for ignoring the DnD flag under certain circumstances, and hence overriding the DnD flag, and for querying and modifying data stored for use in overriding the DnD flag.

The examples which follow employ PTT™ capable PoC networks and wireless devices. More generally embodiments described herein are applicable in the context of any network and wireless device participating in network delivered walkie-talkie-like functionality, of which PTT™ is but one example.

Figure 3:
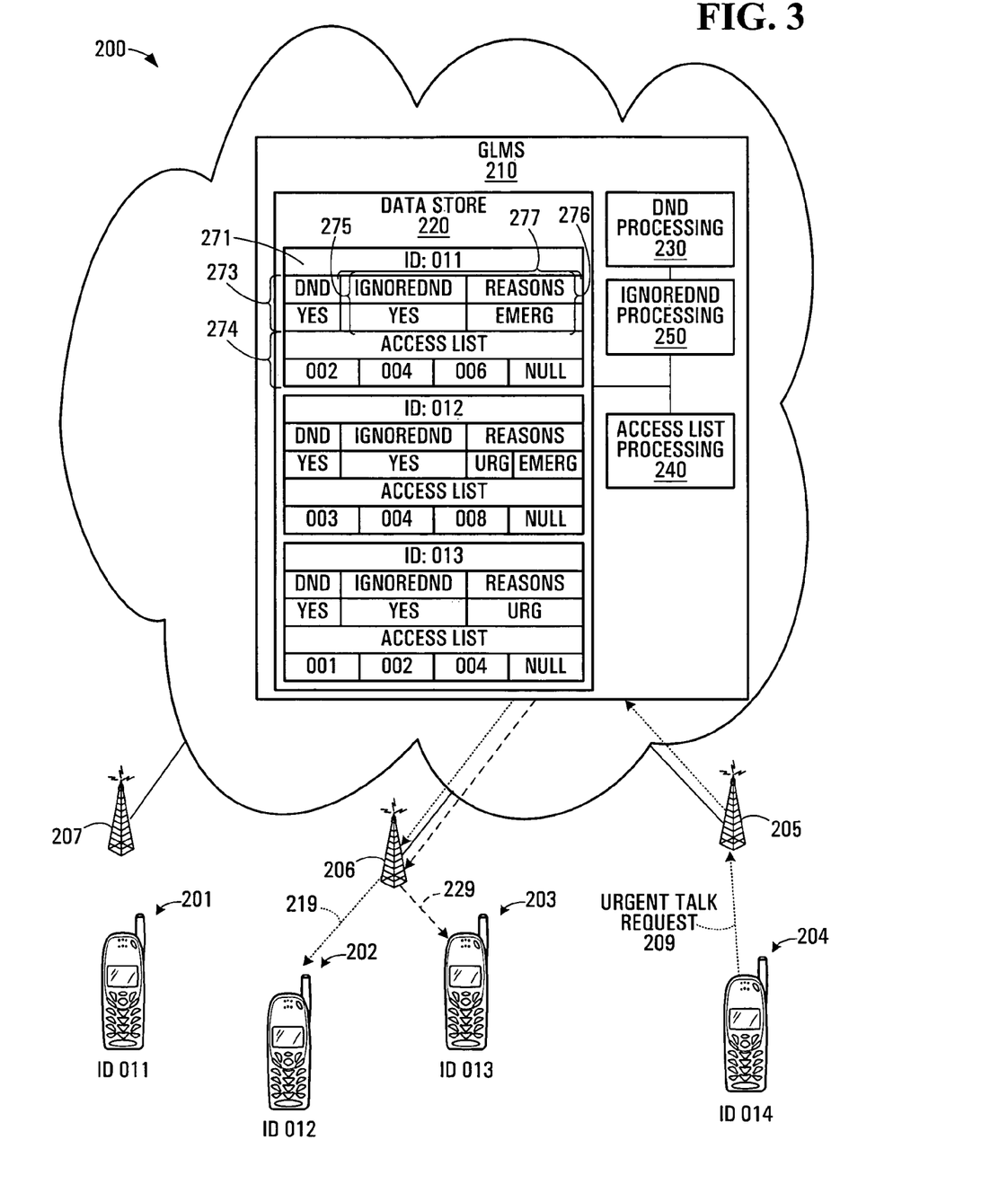
FIG. 3 is a block diagram depicting elements of a modified communications system participating in modified services having modified do-not-disturb functionality according to an embodiment of the invention.

Referring to FIG. 3, a modified OMA system implementing a modified OMA standard in which an example embodiment of the invention operates, will now be discussed.

The modified OMA system of FIG. 3 provides a modified push-to-talk™ over cellular (PoC) service according to the example embodiment, and incorporates a new ignoreDnD flag in conjunction with a new ignore reason list of ignore reason values to determine whether or not, for any particular talk request, the DnD flag of the called device is to be ignored, and hence DnD functionality overridden.

With respect to structure, the specific modified system of FIG. 3 generally indicated by reference numeral 200, includes a modified GLMS (group list management server) 210. The GLMS 210 is a specific example of a call processing server. The GLMS 210 includes a data store 220, an access list processing unit 240, an ignoreDnD processing unit 250, and a DnD processing unit 230. The data store 220, access list processing unit 240, ignoreDnD processing unit 250, and DnD processing unit 230 are coupled to each other for data exchange.

Other embodiments employ different elements of the system to perform similar functionality to that performed by the units 250, 240, 230, of the GLMS 210 of FIG. 3. In some embodiments, each one of the GLMS 210 and the units 250, 240, 230, may be implemented in hardware, software, firmware, or any combination of hardware, software and firmware.

Also shown are three RANs (radio access networks) 205, 206, and 207 of the system coupled through the system 200 to the GLMS 210, and four user devices 201, 202, 203, and 204 having identifiers 011,012,013,014 respectively which may be actively coupled to the system via RANs 205, 206, and 207.

The example of FIG. 3 shows DND processing unit 230, ignoreDnD processing unit 250 and access list processing unit 240 as separate elements. More generally, these may be implemented separately, or in combination, and may be implemented in hardware, software, firmware, or any combination of hardware, software and firmware. In a preferred embodiment, this functionality is included as software which is added to call processing functionality which would be conventionally provided in the GLMS 210. This new functionality may be provided on the GLMS 210 as shown in FIG. 3, and/or may be implemented on a separate device or devices, in a distributed or consolidated manner. Alternatively, this functionality may be provided independent of the GLMS, such as would necessarily be the case in systems not having a GLMS.

The example of FIG. 3 is particular to GLMS in an OMA context. However, OMA implementations are not limited to the example of FIG. 3. Furthermore, while OMA is employed as the basis for the example of FIG. 3, more generally, embodiments of the invention are applicable in any context in which DnD functionality (or DnD-like functionality) is being employed in networks providing a walkie-talkie-like function.

Also, the example of FIG. 3 shows a network consisting of three RANs 205,206,207, and a GLMS 210. More generally, any appropriate network capable of providing walkie-talkie-like connectivity can be employed. This may employ greater or fewer than three RANs, or may employ different equipment altogether. Also, the example of FIG. 3 shows four user devices 201,202,203,204. The actual number of users in a given system will typically be a transient characteristic. A greater or fewer number of users may be present at any given instant.

The data store 220 contains DnD flags and access lists in respect of user devices having identifiers 011, 012, and 013. By way of example, the data for the user device 201 having identifier 011 is indicated generally by 271. The device identifiers may be of any suitable form depending upon the system and network in which they are implemented. The access list, such as access list 274 for user device 201, is provided for each user device (201, 202, 203) and specifies which other users are permitted to reach the respective user device (201, 202, or 203) over PoC. The modified GLMS 210 also stores for each user device a DnD flag, such as DnD flag 273 for user device 201, which may either be a "YES" or a "NO". Other embodiments utilize a DnD flag 273 which is a logical boolean flag having two possible values; true and false. In further embodiments, the DnD flag 273 may be any form of data or data type which may have any number of possible values capable of representing the presence or absence of a do-not-disturb state, or equivalently the presence or absence of a "free-to-disturb" state. Additionally, the modified GLMS 210 stores an ignoreDnD flag for each user device, such as ignoreDND flag 275 for user device 011 (which may have a value of "YES" or "NO") and an ignore reason list 276 for each user device. The ignoreDnD flag 275 and the ignore reason list 276 together form an ignoreDnD attribute 277. In some embodiments the ignoreDnD flag 275 is a logical boolean flag having two possible values; true and false. In other embodiments, the ignoreDnD flag 275 may be any form of data or data type which may have any number of possible values, capable of representing whether or not the DnD flag (or other information) is to be ignored (overriden). The ignore reason list is for storing one or more reasons which a user may select to narrow down the circumstances in which the DnD flag is to be ignored. Examples of reasons are "urgent" and "emergency", but any suitable set of reasons may be allowed in a given system. Furthermore, in some embodiments, no ignore reasons list is employed at all. Rather ignoreDnD processing proceeds solely on the basis of the ignoreDnD flag. Each user device's DnD flag, ignoreDnD flag, ignore reason list, and access list helps facilitate management of talk requests directed to that user device.

In operation, the modified GLMS 210 manages groups and lists (e.g. contact and access lists) that are used for the modified PoC service. Specifically, the GLMS 210 provides list management operations to create, modify, retrieve and delete groups and lists, and to provide storage therefor. Data store 220 provides storage for the modified GLMS 210 including access lists 274, DnD flags 271, ignoreDnD flags 275, and ignore reason lists 276 by user device. The DnD processing unit 230 performs modified DND processing 230, the ignoreDnD processing unit 250 performs new ignoreDnD processing, and access list processing unit 240 performs access list processing.

As with the DnD flags of the standard OMA system, in the modified system depicted in FIG. 3, a user is allowed to select the value of the ignoreDnD flag and the ignore reason list stored in the GLMS 110 for the user's device. This can be done by enhancing the current method that is used to update the access list in GLMS.

In some embodiments the user can also query the current values of the ignoreDnD flag and ignore reasons list.

In this embodiment the user is not permitted to query or set the value of the ignoreDnD flag or any value of the ignore reason list of any other user's device. In other embodiments, a class of special users such as administrators may be given permissions to query and/or modify the value of the ignoreDnD flag and the values in the ignore reason list of other user's devices.

RANs 205, 206, and 207 are for transmitting and receiving signals over channels between the network 200, and user devices. An example of a specific configuration is shown in FIG. 3, in which at one moment in time user device 204 is in communication with RAN 205. RAN 206 is in communication with user devices 202 and 203. User device 201 is neither receiving nor transmitting to any particular RAN. Radio access network 207 is neither receiving nor transmitting any signals to any particular user device. It should be understood that the particular configuration of user devices and base transceiver stations represents a "snapshot" of a possible configuration of user devices in communication with the system 200, and in general at different times will have different numbers of user devices and different types of connections to different user devices depending upon what is happening within the network at that time.

In the specific call and talk request processing example shown in FIG. 3, the user device 204 with ID 014 sends a group talk request as per the underlying PTT™ initiation protocol for a session with user devices 201, 202, and 203, all of which are part of the group. The talk request 209 is marked as "urgent" and is received and forwarded by RAN 205 to the modified system 200. The existing PTT™ initiation protocol can be enhanced to include a priority of each call request. Once the request is forwarded to the modified GLMS 210, ignoreDnD processing takes place in ignoreDnD processing unit 250, DnD processing takes place in DnD processing unit 230, and access list processing 240 take place to determine if the talk request 209 is to be forwarded.

In the illustrated example, each of the user devices 201, 202, and 203, have an associated DnD flag 273 of "YES" in the data store 220 of the GLMS 110. If all of the user devices had ignoreDnD flag 275 values of "NO", then none of the user devices 201, 202, and 203, would be forwarded the talk request 209.

In the example given in FIG. 3, the ignoreDnD flag 275 of each of devices 201, 202, and 203 is set to "YES". User device 201 (ID 011) has one ignore reason value, namely "EMERG" for emergency, associated with it. User device 202 (ID 012) has two ignore reason values, namely "URG" for urgent, and "EMERG", associated with it. User device 203 (ID 013) has one ignore reason value, namely "URG", associated with it.

The user device requesting to talk has sent an "urgent" talk request, and hence only those user devices for which there is an ignore reason value of "urgent" will be forwarded the talk request. Any users whose DnD flag is not set will also be forwarded the talk request. As such only user devices 202 and 203 (having IDs 012 and 013) are forwarded respective talk requests 219 and 229 via RAN 206.

Figure 4:
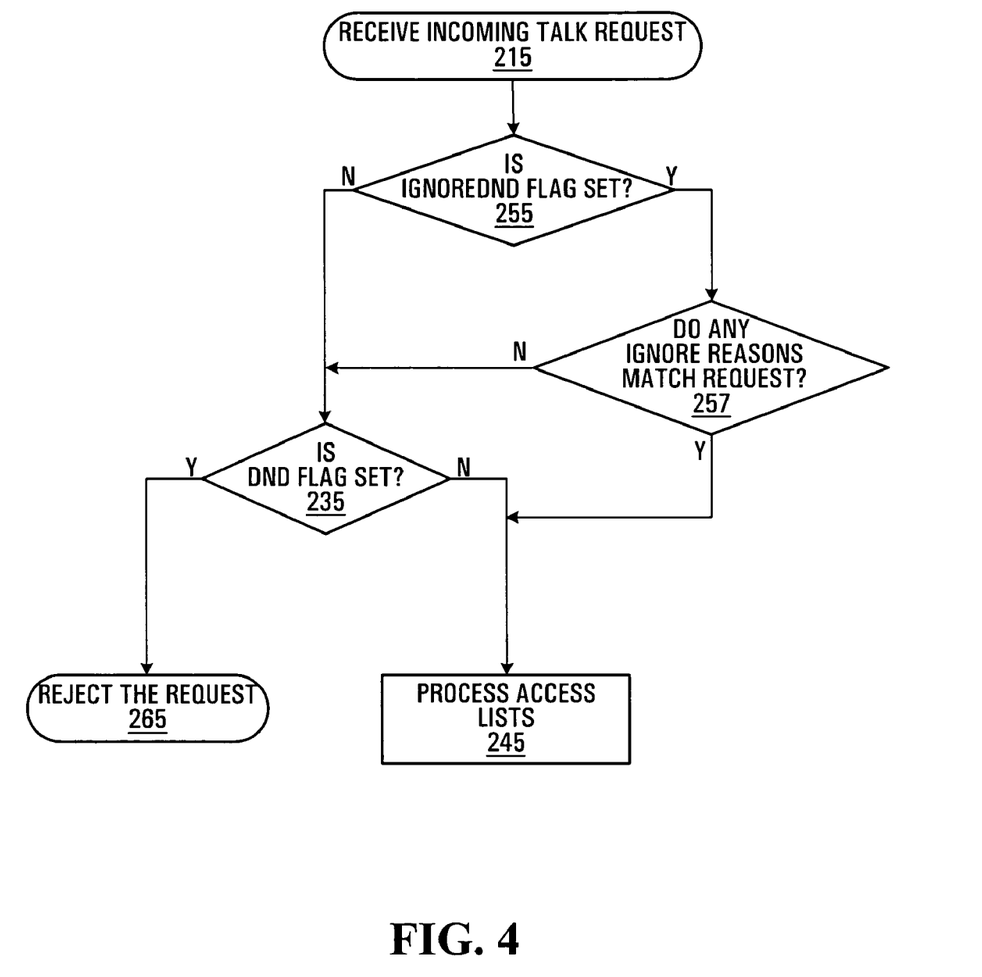
FIG. 4 is a flow diagram illustrating the steps performed by a modified communications system having modified do-not-disturb functionality for processing an incoming talk request to a user device according to another embodiment of the invention.

FIG. 4 shows the steps performed by a modified call service management server in a modified communications system according to an example embodiment to manage incoming calls for a user device. A call processing function, for example a call processing server (CPS), manages the incoming calls with use of a new ignoreDnD flag, a new ignore reason list, and a stored DnD flag, and an access list for the user device.

At step 215, the network receives an incoming talk request specifying the user device as the target device which is being sent the talk request. In step 255 the modified GLMS checks the ignoreDnD flag associated with the target device.

If the ignoreDnD flag is set to "NO" then DnD functionality is not overridden and processing of the talk request continues at step 235 wherein the DnD flag is tested, and if the DnD flag is "YES", the talk request is rejected in step 265 and if the tested DnD flag is "NO", processing of the talk request continues to the step of processing access lists 245.

If the ignoreDnD flag is set to "YES" then processing of the talk request continues at step 257 wherein the ignore reason list is compared to a criterion or condition of the talk request. If any of the ignore reason values matches a criterion or condition of the talk request, processing of the talk request proceeds to the step of processing access lists 245, and the DnD functionality (step 235) is ignored and overridden. If none of the ignore reason values match the criteria of the talk request, the DnD functionality is not overridden, the DnD flag is tested at step 235, and if the DnD flag is "YES", the talk request is rejected in step 265 and if the DnD flag is "NO", processing of the talk request continues to the next step of processing access lists 245.

In some embodiments, the step 235 along with 265 and 245 collectively are responsible for DnD functionality. In some embodiments, the steps 255 and 257 collectively are responsible for ignoreDnD attribute processing.

It should be noted that although the particular embodiments depicted have utilized an ignoreDnD flag, in some embodiments, no ignoreDnD flag is used, and instead, the talk request processing proceeds directly from receiving the talk request at step 215 to comparing the ignore reason list of step 257. In such an embodiment, DnD functionality is ignored only if any one of the ignore reason values matches a current state of the talk request. If a user wishes always to ignore DnD functionality, the ignore reason list is set to contain every possible criteria of a talk request, and if the user wanted not to be disturbed by any call, the list would contain no possible status for any talk request.

Figure 5A:
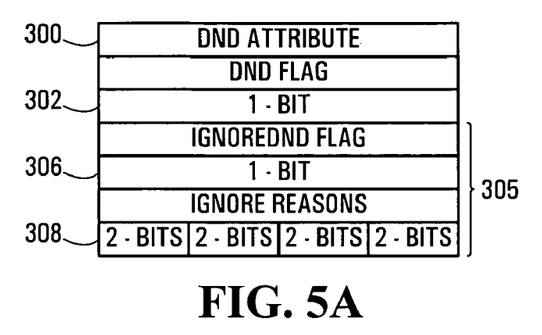
FIG. 5A is a block diagram representation of a datagram for a modified DnD attribute according to a further embodiment of the invention.

Referring to FIG. 5A, a datagram depicting an example of a modified DnD attribute 30 of a modified OMA system according to a preferred embodiment of the invention will now be described.

In this particular preferred embodiment the ignoreDnD flag 306 and ignore reason list 308 are incorporated into an ignoreDnD attribute 305 of a modified DnD attribute 300. The standard DnD flag 302 forms part of the DnD attribute 300 and its value is a 1-bit boolean 302. The ignoreDnD attribute 305 includes an ignoreDnD flag 306 which has as its value a 1-bit boolean, and an ignore reason list 308, which lists up to four possible reasons why the DnD should be ignored, each reason having as its value a 2-bit value. Each of these variables may be of longer or shorter bit-length depending upon the specific implementation. In some embodiments, there may be more than four ignore reasons and hence the bit-length would be longer than 2-bits. The example of FIG. 5A shows headings "DnD attribute" etc. In an actual data store, these headings do not need to be stored as the location of contents is known.

In other embodiments, the DnD flag is always ignored if the incoming call is an emergency call, and hence the ignoreDnD flag would not be required, as long as the ignore reasons were always processed. Conversely, in such an embodiment, an ignoreDnD flag could be set to "YES" and no reason provided as long as the ignoreDnD is only set to "YES" for emergency calls, and if the method step 257 of determining if any ignore reasons match a criterion of the request is always skipped.

In some embodiments, any one 2-bit encoded reason may represent a state that the talk request must meet. In the particular preferred embodiment illustrated in FIG. 5A, each of the 2-bit encoded reasons may be any one selected from the group of, 00 (Emergency), 01 (Urgent), 10 reserve1, 11 reserve2. In this embodiment, the GLMS can be updated by a user at any time as part of a user's change of profile. These reasons are not encoded in the PTT™ request itself, only the PTT™ call type (for example an emergency call or an urgent call) is encoded in the PTT™ request. The existing protocol can be enhanced to include the call type in the call request and ignore DnD reason in the user change request.

Figure 5B:
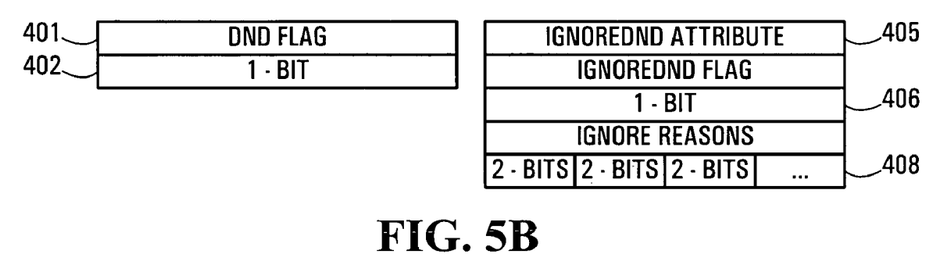
FIG. 5B is a block diagram representation of a datagram for a DnD flag and a datagram for a new ignoreDnD attribute according to yet another embodiment of the invention.

Referring to FIG. 5B, datagrams depicting a standard DnD flag 401 which has a single 1-bit boolean value 402, and a new ignoreDnD attribute 405 according to a second preferred embodiment of the invention will now be described.

In this second preferred embodiment an ignoreDnD flag 406 and an ignore reason list 408 are incorporated into a new ignoreDnD attribute 405. The standard DnD flag 401 is separate from the ignoreDnD attribute 405 and its value is a 1-bit boolean 402. The ignoreDnD flag has as its value a 1-bit boolean 406. Each entry in the ignore reason list 408, which lists possible reasons why the DnD should be ignored, is a 2-bit value 408.

In some embodiments, any one 2-bit encoded reason may represent a state or criterion that the talk request must meet. For example, the 2-bit reason could represent a 2-bit state flag accompanying the talk request or a 2-bit state flag rendered in response to receipt of the talk request to reflect the state of the talk request. In the particular preferred embodiment illustrated in FIG. 5A, each of the 2-bit encoded reasons may be any one selected from the group of, 00 (Emergency), 01 (Urgent), 10 reserve, and 11 reserve, and any talk request may, but not necessarily, be characterized as being an emergency request (00), an urgent request (01), or neither.

Figure 6:
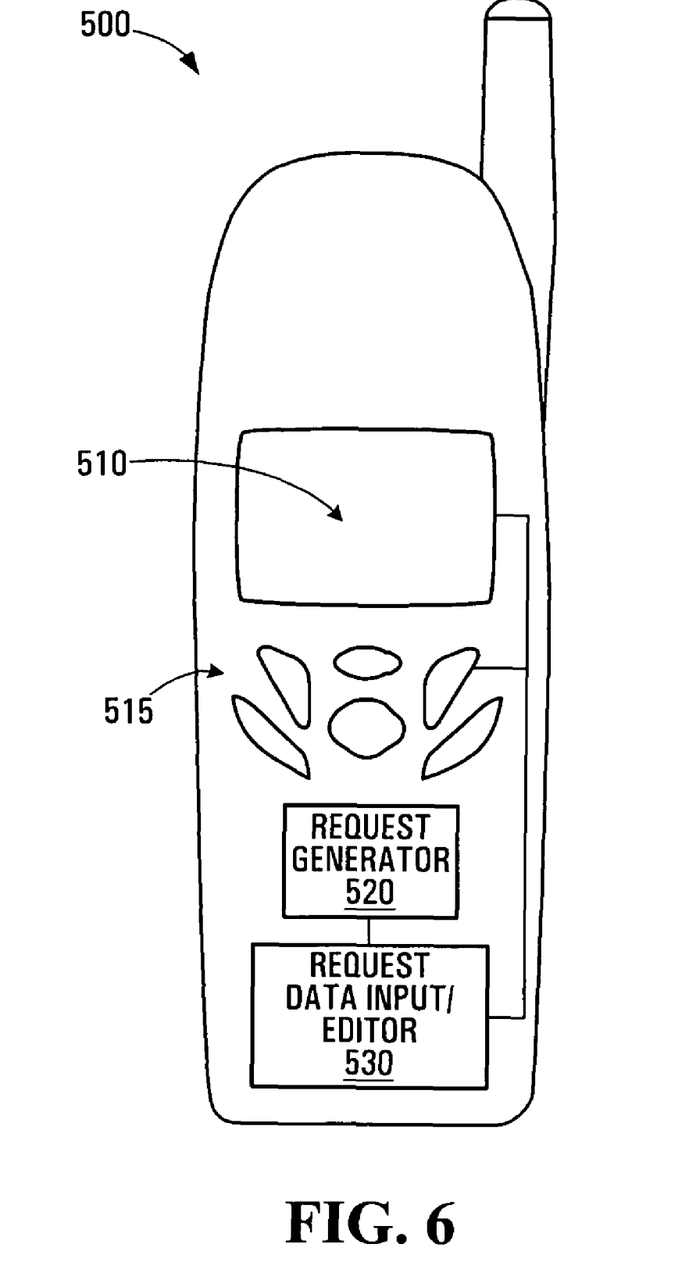
FIG. 6 is a block representation of a modified user device incorporating elements according to an alternate embodiment of the invention.

Referring now to FIG. 6, a modified user device in the form of a wireless mobile device generally indicated by reference number 500 according to a specific embodiment of the invention, will now be discussed.

In this embodiment, to provide a user of the user device the ability to query and set the new ignoreDnD and ignore reason values, new functionality is incorporated in the user device 500 itself. In this embodiment a user would make a selection using any suitable form of user interface (UI) which could be, for example, but not limited to, keys 515, touch screen capability of a user interface (UI) display screen 510, or a voice command responsive interface, to select, query or modify a value for one of the ignoreDnD flag, or ignore reason values. In response to the user selecting this function from the interface modified by new functionality for request data input editor 530, the user interface displays choices of which of the new variables to change and provide functionality for editing them in accordance with the possible range of values each may have. Once the user has finished editing the query request or modify setting request, the new request generator 520 is adapted to send a request to query and/or modify settings of the new variables in the network, for example in the GLMS. In a preferred embodiment, the request generator, and the request data input/editor are implemented as additions/modifications to software running on the device 500. Alternatively separate hardware and/or software and/or firmware may be used. The existing protocol can be enhanced for users to change their DnD setting profiles.

Although the specific embodiments presented herein are in respect of PoC versions of PTT™, any voice communications system which uses do-not-disturb functionality could be adapted in accordance with the invention to provide functionality to ignore the do-not-disturb state in certain circumstances.

It should be understood that although the specific embodiments presented herein are in accordance with an adapted OMA system and standard, that other communications systems and standards for example but not limited to GSM, TDMA, and CDMA, could be adapted according to the invention to provide functionality to ignore or bypass do-not-disturb functionality in certain circumstances or for certain talk requests.

In other embodiments, the method and system are adapted to provide peripheral support for a wired device which is capable of participating in wireless sessions with various talkgroups, and which has an associated ignoreDnD attribute and services provided therefor. Such a wired device participates via a network interworking function, so that although the wired device is not within the wireless network, it appears as though it is, and participates in a group call like a wireless device. Hence, according to these embodiments, the wired user device is provided with services to enable query and modifications to the ignoreDnD attribute so that DnD may be overridden. For these embodiments, talk request processing along with do-not-disturb functionality occurs in a manner analogous to the manner described hereinabove.

Numerous modifications and variations of the present invention are possible in light of the above teachings. It is therefore to be understood that within the scope of the appended claims, the invention may be practiced otherwise than as specifically described herein.

We claim:

1. A method of talk request processing in a do-not-disturb (DnD) capable communication system, the method comprising: receiving a talk request for a requested walkie-talkie-like communications session involving a user device capable of walkie-talkie-like functionality; and selectively overriding DnD functionality for the requested walkie-talkie-like communications session based on an ignoreDnD attribute for the user device applied to a criterion or condition of the talk request other than a user device identifier; wherein the user device is a wireless device; wherein the ignoreDnD attribute comprises an ignoreDnD flag, and wherein selectively overriding said DnD functionality is a function of the ignoreDnD flag; wherein the ignoreDnD attribute comprises at least one predetermined ignore reason value, and wherein selectively overriding said DnD functionality is a function of the at least one predetermined ignore reason value; and wherein the talk request has a current state associated therewith, the current state being one of a number of possible current states for the talk request, wherein each predetermined ignore reason value represents a corresponding possible current state for the talk request, the method further comprising: evaluating the ingoreDnD flag to determine whether further ignoreDnD processing is to be performed, and if evaluating the ignoreDnD flag determines that further ignoreDnD processing is to be performed: a) determining the current state of the talk request; and b) for each of the at least one predetermined ignore reason value:

comparing the corresponding possible current state with the current state of the talk request; wherein said DnD functionality is overridden if any corresponding possible current state matches the current state of the talk request.

2. A method according to claim 1 wherein each possible current state of the number of possible current states for the talk request is a priority state of the talk request at the time it was received.

3. A method according to claim 1 wherein the ignoreDnD flag comprises a boolean value, and wherein:

evaluating the ingoreDnD flag comprises identifying the boolean values and comparing the boolean value to a predetermined boolean value indicative of whether further processing is to be performed.

4. A method according to claim 1 wherein the number of possible current states for the talk request comprise at least one of "urgent", and "emergency".

5. A non-transitory computer readable medium having computer executable instructions stored thereon for execution on a processor so as to implement the method of claim 1.

6. A talk request processing system in a do-not-disturb (DnD) capable communication system, the talk request processing system comprising: a receiver adapted to receive a talk request for a requested walkie-talkie-like communications session involving a user device capable of walkie-talkie-like functionality; and a network call processing function adapted to selectively override DnD functionality for the requested walkie-talkie-like communications session based on an ignoreDnD attribute for the user device applied to a criterion or condition of the talk request other than a user device identifier; wherein the user device is a wireless device; wherein the network call function comprises: a data store adapted to store the ignoreDnD attribute for the user device; a DnD processing function adapted to provide DnD functionality; and an ingnoreDnD processing function adapted to override DnD functionality for the requested walkie-talkie-like communications session as a function of the ignoreDnD attribute stored in the data store for the user device; wherein the ignoreDnD attribute comprises an ignoreDnD flag and at least one predetermined ignore reason value, and wherein the ignoreDnD processing function selectively overrides said DnD functionality as a function of the ignoreDnD flag and the at least one predetermined ignore reason value; and wherein the talk request has a current state associated therewith, the current state being one of a number of possible current states for the talk request, wherein each predetermined ignore reason value represents a corresponding possible current state for the talk request, wherein the ignoreDnD processing function: retrieves the ignoreDnD attribute from the data store; and evaluates the ingoreDnD flag to determine whether further ignoreDnD processing is to be performed, and if evaluating the ignoreDnD flag determines that further ignoreDnD processing is to be performed:

a) determines the current state of the talk request; and b) for each of the at least one predetermined ignore reason value:

compares the corresponding possible current state with the current state of the talk request; wherein said DnD functionality is overridden if any corresponding possible current state matches the current state of the talk request.

7. A talk request processing system according to claim 6 wherein each possible current state of the number of possible current states for the talk request is a priority state of the talk request at the time it was received.

8. A talk request processing system according to claim 6 wherein the ignoreDnD flag comprises a boolean value, and wherein:

evaluating the ingoreDnD flag comprises identifying the boolean and comparing the boolean value to a predetermined boolean value indicative of whether further processing is to be performed.

9. A talk request processing system according to claim 8 wherein the number of possible current states for the talk request comprise at least one of "urgent", and "emergency".

10. A user device capable of walkie-talkie-like functionality for a do-not-disturb (DnD) capable communication system, the user device comprising:

a user interface adapted to accept an external input to modify an ignoreDnD attribute for the user device the ignoreDnD attribute concerning a criterion or condition of a talk request other than a user device identifier;

an ignoreDnD attribute request generator responsive to said external input adapted to send a network call processing server a request to update the ignoreDnD attribute of the user device; and a user interface display for displaying modifications for the ignoreDnD attribute indicated by the external input;

wherein the user device is a wireless device; and wherein the user interface is further adapted to accept an external query input to retrieve an ignoreDnD attribute for the user device, the ignore DnD attribute request generator is further adapted to:

(a) send a network call processing server a query to retrieve the ignoreDnD attribute of the user device; and b) receive a response to said query from the network;

wherein the user interface display is adapted to, in response to the ignoreDnD attribute request generator receiving the response to said query, display the ignoreDnD attribute for the user device.

\* \* \* \* \*